(12) United States Patent
Wang

(10) Patent No.: US 8,683,057 B2
(45) Date of Patent: Mar. 25, 2014

(54) METHOD FOR CONVERSION BETWEEN SIP MESSAGE AND ISUP MESSAGE AND CONVERSION APPARATUS

(75) Inventor: Tao Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 205 days.

(21) Appl. No.: 13/384,668

(22) PCT Filed: Sep. 14, 2009

(86) PCT No.: PCT/CN2009/073907
§ 371 (c)(1),
(2), (4) Date: Jan. 18, 2012

(87) PCT Pub. No.: WO2011/029240
PCT Pub. Date: Mar. 17, 2011

(65) Prior Publication Data
US 2012/0124230 A1    May 17, 2012

(51) Int. Cl.
*G06F 15/16* (2006.01)
(52) U.S. Cl.
USPC ........... 709/228; 709/203; 709/227; 370/352; 379/221.13
(58) Field of Classification Search
USPC .......... 709/203, 227, 228; 370/352, 389, 467, 370/524; 379/220.01, 221.01, 221.13
See application file for complete search history.

(56) References Cited

U.S. PATENT DOCUMENTS

| | | | | |
|---|---|---|---|---|
| 6,636,596 | B1 * | 10/2003 | Gallant et al. | ........... 379/220.01 |
| 2002/0186723 | A1 * | 12/2002 | Sprague et al. | ............... 370/524 |
| 2003/0076815 | A1 * | 4/2003 | Miller et al. | ................... 370/352 |
| 2007/0014294 | A1 * | 1/2007 | Delaney et al. | ............... 370/392 |
| 2007/0258575 | A1 * | 11/2007 | Douglas et al. | ........... 379/221.13 |
| 2007/0282911 | A1 * | 12/2007 | Bantukul et al. | ........... 707/104.1 |
| 2010/0190492 | A1 * | 7/2010 | Jiang | ........................... 455/432.1 |

FOREIGN PATENT DOCUMENTS

| | | |
|---|---|---|
| CN | 101132400 A | 2/2008 |
| KR | 20030015800 A | 2/2003 |

OTHER PUBLICATIONS

G. Camarillo et al., "Integrated Services Digital Network (ISDN) User Part (ISUP) to Session Initiation Protocol (SIP) Mapping".
International Search Report.
European Search Report dated Sep. 19, 2013 for Application No. 09849116.0-1853.

(Continued)

*Primary Examiner* — Frantz Jean
(74) *Attorney, Agent, or Firm* — Harness, Dickey & Pierce

(57) ABSTRACT

A method for conversion between SIP message and ISUP message for number portability service and corresponding conversion apparatus are provided. In the method for converting the ISUP message into the SIP message, the ISUP message is received and parameters related to number portability are read from the ISUP message, a number portability type is determined according to the parameters related to number portability, and the parameters related to number portability are mapped into the SIP message based on the number portability type. The SIP message includes: destination address parameter, which represents destination user number; npdi parameter, which indicates execution of the number portability dip and uniquely identifies the number portability type; and rn parameter, which represents the number to be routed to the destination user number. The conversion apparatus for converting ISUP message into SIP message and the method for converting SIP message into ISUP message and corresponding conversion apparatus are also provided.

16 Claims, 5 Drawing Sheets

(56) References Cited

OTHER PUBLICATIONS

J. Peterson/L. Ong—"Mapping of ISUP parameters to SIP headers in SIP-T", Internet Draft—Feb. 2001 for Internet Engineering Task Force.

Camarillo/Roach/Peterson/Ong—"ISUP to SIP Mapping"—ETSI Draft (May 2002).

Eva Frölich Neustar Inc.—Foster / McGarry / Yu—Neustar Inc.—"Number Portability in the Global Switched Telephone Network (GSTN), an Overview—C 33"—Jun. 2003—ITU—Geneva.

Foster /McGarry / Yu—Neustar Inc.—"Number Portability in the Global Switched Telephone Network (GSTN), an Overview"—Feb. 2003.

* cited by examiner

METHOD FOR CONVERSION BETWEEN SIP MESSAGE AND ISUP MESSAGE AND CONVERSION APPARATUS

TECHNICAL FIELD OF THE INVENTION

The present invention relates to number portability service, in particular, to the technique for conversion between Session Initiation Protocol (SIP) message and ISDN User Part (ISUP) message when using the number portability service.

BACKGROUND OF THE INVENTION

Nowadays, the number portability (NP) service is a very popular and useful service, which allows subscriber to select different telecommunication operators while retains his original telephone number. In the legacy SS7 network, when implementing number portability service, several methods for performing number portability query can be used, and accordingly several methods for carrying the number portability information over ISUP signaling can be used.

With the communication network gradually evolves to the Internet Protocol (IP) based network such as VoIP network, the interface between switches is also replaced by SIP-I protocol interface. Technical specification RFC3398 defines rules of how to map between SIP message and ISUP message, based on these rules, parameters in the ISUP message can be converted into fields of the SIP message. Since number portability information is usually carried by the Initial Address Message (IAM) of the ISUP message, RFC3398 also defines new parameters of the SIP message for number portability: number portability dip parameter (npdi) which indicates execution of the number portability dip, and routing number parameter (rn) which stores the routing number to be routed to a destination user. These two new parameters are equivalent to number translation indicator bit (bit M) in forward call indicator (FCI) and called party number (CdPN) in the ISUP message of the legacy SS7 domain respectively.

In addition, in IP Multimedia Subsystem (IMS) network, ENUM database may also be used to implement the number portability service. ENUM is a protocol defined by Telephone Number Mapping working group of IETF, which defines rules for mapping E.164 telephone number into domain name and manner of storing the domain name related information in Internet DNS (Domain Name Server) database. By using the ENUM mechanism, E.164 telephone number can be mapped into a variety of information such as traditional telephone number, mobile telephone number, email address, IP telephone number, IP fax or personal Web page, such that the subscriber can easily realize the number portability.

For the communication system containing SIP network and ISUP network, the switches at edge of the network have both SIP interface and ISUP interface. For example, when a call is initiated by a subscriber in the ISUP network and terminated by a subscriber in the ISUP network via the SIP network, after the number portability query is performed on the calling switch, the ISUP message carrying the number portability information will be transmitted to the called switch. When the ISUP message is entering into the SIP network, it needs to be converted into the SIP message for transmission in the SIP network. When the SIP message enters into the ISUP network, it needs to be converted into the ISUP message again. So in this case, the ISUP and SIP messages need to be mapped into each other for many times.

Currently, there are various types of number portability in the legacy SS7 network. However, in the SIP message, the number portability information only can be represented by the afore-mentioned npdi parameter and rn parameter. According to RFC3398 specification, it is very easy to convert the number portability information in the ISUP message to the number portability information in the SIP message. The number portability information is represented by the npdi parameter and rn parameter in the SIP message regardless of the type of the number portability. However, it is very difficult to map the number portability information in the SIP message into the ISUP message, because the mapping from the ISUP message to the SIP message is a n-to-1 mapping, while the mapping from the SIP message to the ISUP message is a 1-to-n mapping. This kind of mapping has following defects: once the ISUP message is mapped into the SIP message, the subsequent switches have no idea of what kind of number portability has been executed, thus when the SIP message is mapped back to the ISUP message, the switches have no idea that the number portability information in the SIP message should be mapped into what parameters in the ISUP message, which may cause that the ISUP message mapped from the SIP message is different from the initial ISUP message.

As mentioned above, the npdi parameter is used to indicate the execution of the number portability dip. If the number portability dip operation has been executed, the npdi parameter would be contained in the SIP message. If the operation has not been executed, the npdi parameter would not be contained in the SIP message. According to RFC3398, if no 'npdi=yes' field is contained within the SIP message 'Request-URI', the number (which represents the telephone number of the destination user) in the 'tel URL' must be converted into the ISUP format and become the parameter for called party number (CdPN). If the 'npdi=yes' field is contained in the 'Request-URI', the number translation indicator bit in FCI within the IAM message must reflect that the number portability dip has been executed. However, the npdi parameter does not indicate what type of number portability has been executed.

SUMMARY OF THE INVENTION

The present invention is proposed in view of the above technical problems, and its objective is to provide a method and apparatus for converting ISUP message into SIP message for number portability service, and a method and apparatus for converting SIP message into ISUP message for number portability service, such methods and apparatuses being able to realize 1-to-1 mapping between the SIP message and the ISUP message when utilizing the number portability service.

According to a first aspect of the present invention, there is provided a method for converting ISUP message into SIP message for number portability service, which comprises: receiving the ISUP message; reading parameters related to number portability from the ISUP message; determining a number portability type according to the parameters related to number portability; mapping the parameters related to number portability into the SIP message based on the number portability type, wherein the SIP message includes: destination address parameter, which represents destination user number; number portability dip (npdi) parameter, which indicates execution of the number portability dip and uniquely identifies the number portability type; and routing number (rn) parameter, which represents the number to be routed to the destination user number.

According to a second aspect of the present invention, there is provided a conversion apparatus for converting ISUP message into SIP message for number portability service, which comprises: receiving means that receives the ISUP message; reading means that reads parameters related to number portability from the ISUP message; type determination means that determines a number portability type according to the parameters related to number portability; mapping means that maps the parameters related to number portability into the SIP message based on the number portability type, wherein the SIP message includes: destination address parameter, which represents destination user number; number portability dip (npdi) parameter, which indicates execution of the number portability dip and uniquely identifies the number portability type; and routing number (rn) parameter, which represents the number to be routed to the destination user number.

According to a third aspect of the present invention, there is provided a method for converting SIP message into ISUP message for number portability service, wherein the SIP message includes: destination address parameter, which represents destination user number; number portability dip (npdi) parameter, which indicates execution of the number portability dip and uniquely identifies a number portability type; and routing number (rn) parameter, which represents the number to be routed to the destination user number; the method comprising: receiving the SIP message; reading the npdi parameter from the SIP message to determine the number portability type; determining parameters related to number portability in the ISUP message based on the number portability type; and mapping the destination address parameter and the routing number parameter in the SIP message to the parameters related to number portability in the ISUP message respectively.

According to a fourth aspect of the present invention, there is provided a conversion apparatus for converting SIP message into ISUP message for number portability service, wherein the SIP message includes: destination address parameter, which represents destination user number; number portability dip (npdi) parameter, which indicates exectuion of the number portability dip and uniquely identifies a number portability type; and routing number (rn) parameter, which represents the number to be routed to the destination user number; the conversion apparatus comprising: receiving means that receives the SIP message; reading means that reads the npdi parameter from the SIP message to determine the number portability type; parameter determination means that determines parameters related to number portability in the ISUP message based on the number portability type; and mapping means that maps the destination address parameter and the routing number parameter in the SIP message to the parameters related to number portability in the ISUP message respectively.

DETAILED DESCRIPTION OF THE PREFERRED EMBODIMENTS

It is believed that the above and other objects, features and advantages of the present invention will be more apparent through the following detailed description of the preferred embodiments of the present invention in conjunction with the accompany drawings.

Figure 1:
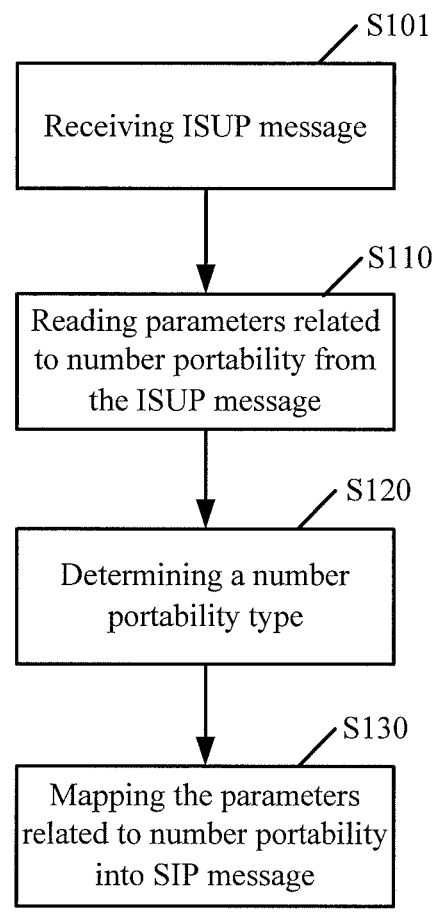
FIG. 1 is a flowchart of the method for converting ISUP message into SIP message for number portability service according to an embodiment of the present invention.

FIG. 1 is a flowchart of the method for converting ISUP message into SIP message for number portability service according to an embodiment of the present invention. This embodiment will be described in detail in conjunction with FIG. 1.

In this embodiment, the meaning and value of the npdi parameter in the SIP message are extended, such that the npdi parameter can uniquely identify a number portability type, that is, the value (positive integer) of the npdi parameter can be used to indicate the number portability type. Number portability type can be determined according to the protocol between switches and a number portability query database and the method for carrying the number portability information by the ISUP message. Of course, it is appreciated by those skilled in the art that the number portability type may be determined by other means.

As shown in FIG. 1, at step S101, the ISUP message carrying the number portability information is received. In this embodiment, the ISUP message carrying the number portability information is IAM message.

Next, at step S110, the parameters related to number portability are read from the ISUP message. These parameters represent the number portability information. In the ISUP message, the parameters related to number portability are different depending on the different methods for carrying the number portability information. The followings are several most commonly used methods for carrying the number portability information by the ISUP message and the corresponding parameters related to number portability.

1. Use the number translation indicator bit in forward call indicator (FCI bit M), called party number (CdPN) and generic address parameter (GAP) to represent the number portability information. In this method, the protocol between the switches and the number portability database is IS41 or T1.708 protocol. After the number portability query is executed, the returned ten-digit location routing number (LRN) is put into the CdPN of the ISUP message, the original dialed directory number (DN) is put into the GAP, and the number translation indicator bit is set to 1, indicating that the number portability query has been executed, as shown in Table 1.

TABLE 1

|  | Before number portability query | After number portability query |
| --- | --- | --- |
| FCI bit M | 0 | 1 |
| GAP | N/A | DN |
| CdPN | DN | LRN |

2. Use the called party number (CdPN), called directory number (CdDN) and nature of address (NOA) parameter to represent the number portability information. In this method, after the number portability query is executed, the returned routing number (RN) is put into the CdPN, the directory number (DN) is put into the CdDN, and the NOA parameter is set to a special value for number portability, as shown in Table 2.

TABLE 2

|  | Before number portability query | After number portability query |
|---|---|---|
| CdPN | DN | RN |
| CdDN | N/A | DN |
| NOA parameter | N/A | Special value |

3. Use the called party number (CdPN) and network routing number (NRN) to represent the number portability information. In this method, after the number portability query is executed, the returned routing number (RN) is put into the NRN, and the directory number (DN) is still put into the CdDN, as shown in Table 3.

TABLE 3

|  | Before number portability query | After number portability query |
|---|---|---|
| CdPN | DN | DN |
| NRN | N/A | RN |

4. Use the called party number (CdPN) and nature of address (NOA) parameter to represent the number portability information. In this method, after the number portability query is executed, the returned routing number (RN) is concatenated with the directory number (DN), and the concatenated RN and DN is put into the CdPN, and the NOA parameter is set to 126, as shown in Table 4.

TABLE 4

|  | Before number portability query | After number portability query |
|---|---|---|
| CdPN | DN | RN + DN |
| NOA | Domestic or international | 126 |

Although some typical parameters related to number portability in the ISUP message have been provided above, it should be appreciated by those skilled in the art that the parameters related to number portability are not limited thereto and may comprise other parameters to represent the number portability information. The parameters related to number portability can be determined according to characteristics of a communication system.

Then, at step S120, the number portability type is determined according to the parameters related to number portability read in the step S110.

In the embodiment, the number portability type database records associations between the number portability types and the parameters related to number portability in the ISUP messages, and the association is indexed on the number portability type, as shown in Table 5.

TABLE 5

| Number portability type | Parameters related to number portability |
|---|---|
| Type 1 | FCI bit M, CdPN, GAP |
| Type 2 | CdPN, CdDN, NOA parameter |
| Type 3 | CdPN, NRN |
| Type 4 | CdPN, NOA parameter |

Thus, the number portability type corresponding to the parameters related to number portability in the ISUP message can be obtained by querying the number portability type database. The number portability type database can be created in advance.

Then, at step S130, the parameters related to number portability in the ISUP message are mapped into the SIP message based on the number portability type determined in the step S120. In the embodiment, the SIP message includes: destination address parameter, which represents destination user number; npdi parameter, which indicates execution of the number portability dip and uniquely identifies the number portability type; and rn parameter, which represents the number to be routed to the destination user number. Unlike the existing SIP message, the npdi parameter in the SIP message, in this embodiment, not only indicates the execution of the number portability dip, but also uniquely identifies the executed number portability type. Usually, the IAM message in ISUP signaling is mapped to the INVITE message in the SIP signaling.

Specifically, if the number portability type determined at the step S120 is Type 1, the GAP parameter is mapped to the destination address parameter (in the INVITE message, corresponding to 'tel:' and 'to:' fields in the 'Request-URI' field), the CdPN is mapped to the rn parameter, and the npdi parameter is set to 1, that is, the mapped SIP message is 'tel:+GAP; rn=+CdPN; npdi=1'.

If the number portability type determined at the step S120 is Type 2, the CdDN is mapped to the destination address parameter, the CdPN is mapped to the rn parameter, and the npdi parameter is set to 2, that is, the mapped SIP message is 'tel:+CdDN; rn=+CdPN; npdi=2'.

If the number portability type determined at the step S120 is Type 3, the CdPN is mapped to the destination address parameter, the NRN is mapped to the rn parameter, and the npdi parameter is set to 3, that is, the mapped SIP message is 'tel:+CdPN; rn=+NRN; npdi=3'.

If the number portability type determined at the step S120 is Type 4, the CdPN is mapped to the destination address parameter and the npdi parameter is set to 4, that is, the mapped SIP message is 'tel:+CdPN; npdi=4'. Alternatively, the DN in the CdPN is mapped to the destination address parameter, the RN in the CdPN is mapped to the rn parameter, and the npdi parameter is set to 4, that is, the mapped SIP message is 'tel:+DN; rn=RN; npdi=4'.

In addition, although the embodiment in which the npdi parameter in the SIP message is extended to identify the number portability type is described above, it is appreciated by those skilled in the art that a new parameter can be set in the SIP message to represent the number portability type. In this case, the method for converting ISUP message into SIP message of this embodiment is also applicable.

It can be seen from the above description that the method for converting ISUP message into SIP message of this embodiment can realized the 1-to-1 mapping from the ISUP message to the SIP message by extending the meaning and value of the npdi parameter in the SIP message, and thus solve the existing problem that the downstream switches have no idea about what kind of number portability has been executed.

Figure 2:
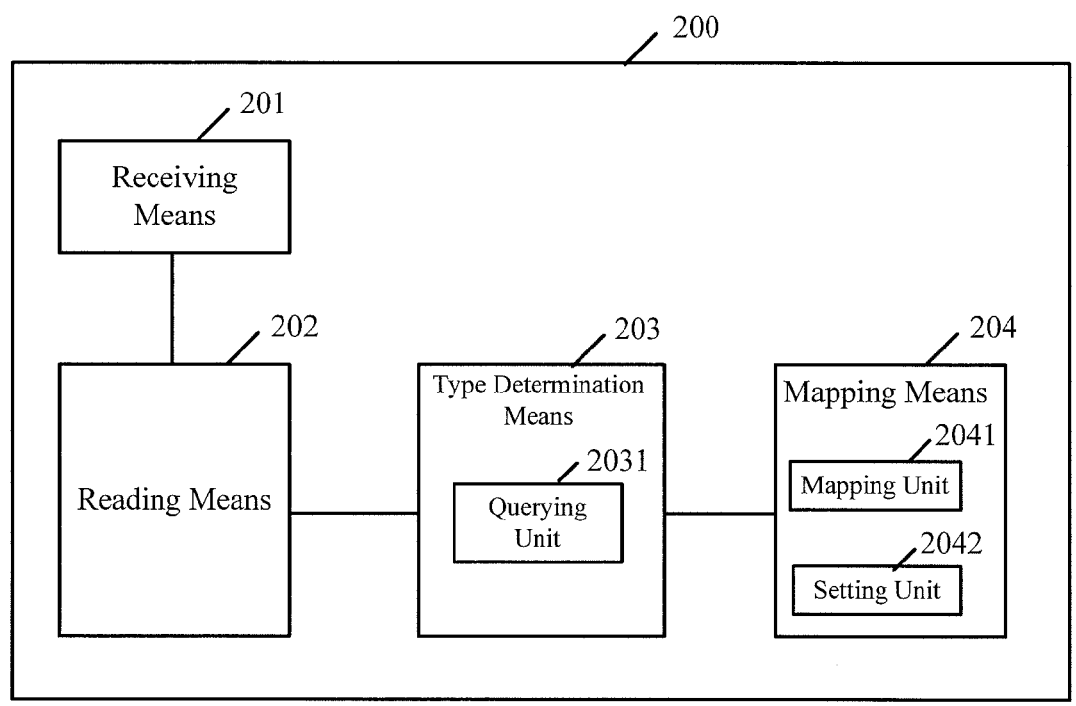
FIG. 2 is a schematic block diagram of the conversion apparatus for converting ISUP message into SIP message for number portability service according to an embodiment of the present invention.

Under the same inventive concept, FIG. 2 shows the schematic block diagram of the conversion apparatus 200 for converting ISUP message into SIP message for number portability service according to an embodiment of the present invention. This embodiment will be described in detail in conjunction with FIG. 2, wherein the description for the same parts as those in the previous embodiment will be properly omitted.

As shown in FIG. 2, the conversion apparatus 200 of the embodiment comprises: receiving means 201 which receives the ISUP message; reading means 202 which reads the parameters related to number portability from the received ISUP message; type determination means 203 which determines the number portability type according to the read parameters related to number portability; and mapping means 204 which maps the parameters related to number portability in the received ISUP message into the SIP message based on the determined number portability type. The SIP message includes: the destination address parameter, which represents the destination user number; the npdi parameter, which indicates the execution of the number portability dip and uniquely identifies the number portability type; and the rn parameter, which represents the number to be routed to the destination user number.

In the conversion apparatus 200, the receiving means 201 receives the ISUP message carrying the number portability information. In the embodiment, the ISUP message is the IAM message. Next, the reading means 202 reads the parameters related to number portability from the ISUP message. The parameters related to number portability have been described above in detail and their description is omitted here.

Then, the type determination means 203 determines the number portability type according to the parameters related to number portability read by the reading means 202. Specifically, in the type determination means 203, querying unit 2031 queries the number portability type database to retrieve the number portability type. The number portability type database records the number portability types and the corresponding parameters related to number portability in the ISUP message, as shown in Table 5.

After the number portability type is determined, the mapping means 204 maps the parameters related to number portability read by the reading means 202 into the SIP message.

Specifically, in the mapping means 204, when the number portability type is Type 1, mapping unit 2041 maps the GAP in the ISUP message to the destination address parameter in the SIP message (in the INVITE message, corresponding to 'tel:' and 'to:' fields in 'Request-URI' field), and maps the CdPN in the ISUP message to the rn parameter in the SIP message. Setting unit 2042 sets the npdi parameter in the SIP message to 1.

When the number portability type is Type 2, the mapping unit 2041 maps the CdDN in the ISUP message to the destination address parameter in the SIP message, and maps the CdPN in the ISUP message to the rn parameter in the SIP message. The setting unit 2042 sets the npdi parameter in the SIP message to 2.

When the number portability type is Type 3, the mapping unit 2041 maps the CdPN in the ISUP message to the destination address parameter in the SIP message, and maps the NRN in the ISUP message to the rn parameter in the SIP message. The setting unit 2042 sets the npdi parameter in the SIP message to 3.

When the number portability type is Type 4, the mapping unit 2041 maps the CdPN in the ISUP message to the destination address parameter in the SIP message. Alternatively, the mapping unit 2041 maps the DN in the CdPN to the destination address parameter in the SIP message, and maps the RN in the CdPN to the rn parameter in the SIP message. The setting unit 2042 sets the npdi parameter in the SIP message to 4.

It would be noted that the conversion apparatus 200 of this embodiment is operable to implement the method for converting ISUP message into SIP message for number portability service as shown in FIG. 1.

Figure 3:
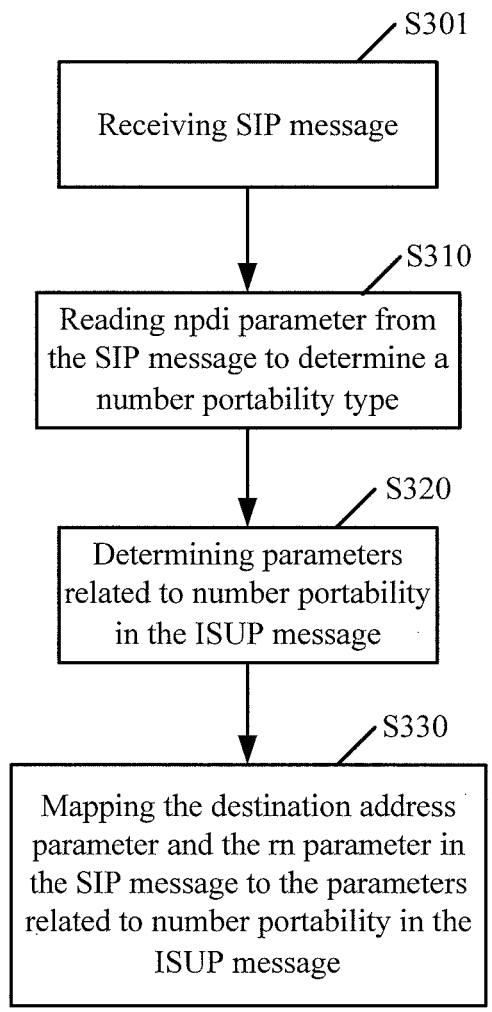
FIG. 3 is a flowchart of the method for converting SIP message into ISUP message for number portability service according to an embodiment of the present invention.

Under the same inventive concept, FIG. 3 shows the flowchart of the method for converting SIP message into ISUP message for number portability service according to an embodiment of the present invention. The embodiment will be described in detail in conjunction with FIG. 3, wherein the description for the same parts as those in the previous embodiment will be properly omitted.

In this embodiment, the npdi parameter in the SIP message is extended, such that it is capable of uniquely identifying the number portability type. The extended SIP message comprises: the destination address parameter which represents the destination user number, the npdi parameter which indicates the execution of the number portability dip and uniquely identifies the number portability type, and the rn parameter which represents the number to be routed to the destination user number. The npdi parameter and rn parameter in the SIP message represent the number portability information.

Regarding the number portability type, it has been described above and will not be described here.

As shown in FIG. 3, at step S301, the SIP message carrying the number portability information is received. In the embodiment, the SIP message carrying the number portability information is INVITE message.

Next, at step S310, the npdi parameter in the SIP message is read to determine the number portability type. As described above, the npdi parameter uniquely identifies the number portability type, and thus the value of the npdi parameter can be considered as the number portability type.

Then, at step S320, the parameters related to number portability in the ISUP message are determined according to the number portability type determined at the step S310. In the embodiment, the number portability type database records the associations between the number portability types and the corresponding parameters related to number portability in the ISUP message, as shown in Table 5. Therefore, the parameters related to number portability in the ISUP message corresponding to the number portability type can be obtained by querying the number portability type database. In the embodiment, the ISUP message is the IAM message.

Then, at step S330, the destination address parameter and the rn parameter in the received SIP message are mapped to the parameters related to number portability in the ISUP message determined at the step S320 respectively.

Specifically, when the number portability type is Type 1, the FCI bit M in the ISUP message is set to 1, the rn parameter in the SIP message is mapped to the CdPN in the ISUP message, and the destination address parameter in the SIP parameter is mapped to the GAP in the ISUP message.

When the number portability type is Type 2, the rn parameter in the SIP message is mapped to the CdPN in the ISUP message, the destination address parameter in the SIP parameter is mapped to the CdDN in the ISUP message, and the NOA parameter in the ISUP message is set to the special value for the number portability.

When the number portability type is Type 3, the destination address parameter in the SIP parameter is mapped to the CdPN in the ISUP message, and the rn parameter in the SIP message is mapped to the NRN in the ISUP message.

When the number portability type is Type 4, the destination address parameter in the SIP message is mapped to the CdPN in the ISUP message, or the rn parameter and the destination address parameter in the SIP message are concatenated and mapped to the CdPN in the ISUP message, and the NOA parameter in the ISUP message is set to 126.

It can be seen from the above description that the method for converting SIP message into ISUP message for number portability service of this embodiment can realize the 1-to-1 mapping from the SIP message to the ISUP message by extending the meaning and value of the npdi parameter in the SIP message, and thus solve the existing problem that the downstream switches have no idea about what kind of number portability has been executed and therefore have no idea of mapping the number portability information in the SIP message to which parameters in the ISUP message.

Figure 4:
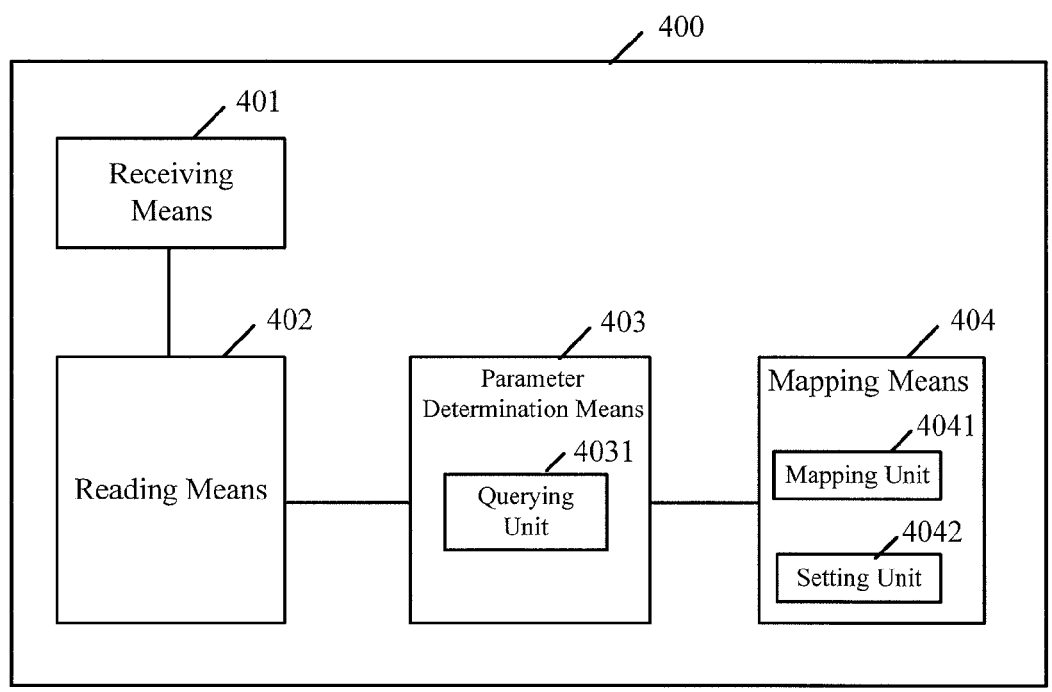
FIG. 4 is a schematic block diagram of the conversion apparatus for converting SIP message into ISUP message for number portability service according to an embodiment of the present invention.

Under the same inventive concept, FIG. 4 shows the schematic block diagram of the conversion apparatus 400 for converting SIP message into ISUP message for number portability service according to an embodiment of the present invention. This embodiment will be described in detail in conjunction with FIG. 4, wherein the description for the same parts as those in the previous embodiment will be properly omitted.

In this embodiment, the npdi parameter in the SIP message is extended. The extended SIP message comprises the destination address parameter which represents the destination user number, the npdi parameter which indicates the execution of the number portability dip and uniquely identifies the number portability type, and the rn parameter which represents the number to be routed to the destination user number.

As shown in FIG. 4, the conversion apparatus 400 of the embodiment comprises: receiving means 401 which receives the SIP message carrying the number portability information, reading means 402 which reads the npdi parameter from the received SIP message to determine the number portability type, parameter determination means 403 which determines the parameters related to number portability in the ISUP message based on the determined number portability type, and mapping means 404 which maps the destination address parameter and the rn parameter in the received SIP message to the determined parameters related to number portability in the ISUP message respectively.

In the conversion apparatus 400 of the embodiment, after the receiving means 401 receives the SIP message, the reading means 402 reads the npdi parameter from the SIP message, so as to determine the number portability type. As described above, the npdi parameter uniquely identifies the number portability type, and thus the value of the npdi parameter can be considered as the number portability type.

Then, the determined number portability type is provided to the parameter determination means 403 to determine the parameters related to number portability in the ISUP message. Specifically, in the parameter determination means 403, querying unit 4031 queries the number portability type database to retrieve the parameter related to number portability in the ISUP message corresponding to the number portability type. The number portability type database records the number portability types and the corresponding parameters related to number portability in the ISUP message, with the number portability type as index, as shown in Table 5.

Then, the mapping means 404 maps the destination address parameter and the rn parameter in the SIP message to the parameters related to number portability in the ISUP message determined by the parameter determination means 403 respectively.

Specifically, in the mapping means 404, when the number portability type is Type 1, mapping unit 4041 maps the rn parameter in the SIP message to the CdPN in the ISUP message, and maps the destination address parameter in the SIP message to the GAP in the ISUP message. Setting unit 4042 sets the FCI bit M in the ISUP message to 1.

When the number portability type is Type 2, the mapping unit 4041 maps the rn parameter in the SIP message to the CdPN in the ISUP message, and maps the destination address parameter in the SIP message to the CdDN in the ISUP message. The setting unit 4042 sets the NOA parameter in the ISUP message to the special value for the number operability.

When the number portability type is Type 3, the mapping unit 4041 maps the destination address parameter in the SIP message to the CdPN in the ISUP message, and maps the rn parameter in the SIP message to the NRN in the ISUP message.

When the number portability type is Type 4, the mapping unit 4041 maps the destination address parameter in the SIP message to the CdPN in the ISUP message. Alternatively, the mapping unit 4041 concatenates the rn parameter and the destination address parameter in the SIP message and maps the concatenate rn and destination address parameter to the CdPN in the ISUP message. The setting unit 4042 sets the NOA parameter in the ISUP message to 126.

It should be noted that the conversion apparatus 400 of the embodiment is operable to implement the method for converting SIP message into ISUP message for number portability service as shown in FIG. 3.

It should be noted that the conversion apparatus 200 for converting ISUP message into SIP message for number portability service and the conversion apparatus 400 for converting SIP message into ISUP message for number portability service of the above-described embodiments and their respective components may be implemented by hardware circuits such as large scale integrated circuits or gate arrays, semiconductors such as logic chip or transistors, or programmable hardware devices such as field programmable gate array, programmable logic device etc, or can be implemented by software executed by various types of processors, or can be implemented by a combination of the above hardware circuit and software.

Figure 5:
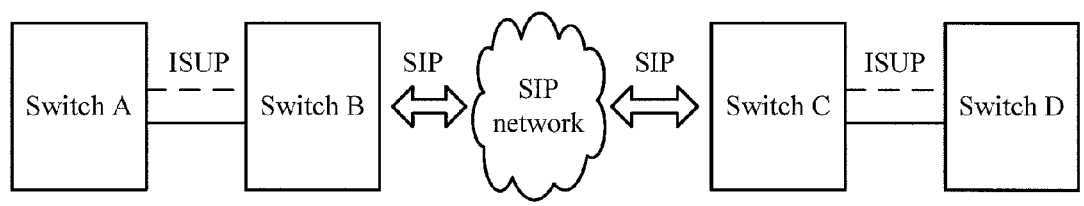
FIG. 5 is a schematic block diagram of the communication system in which the embodiments shown in FIGS. 1 to 4 are employed.

FIG. 5 shows the schematic block diagram of a communication system in which the embodiments shown in FIGS. 1 to 4 can be employed. The communication system comprises the ISUP network and the SIP network, wherein the switch A and the switch B are communicated with each other via ISUP protocol, the switch B and the switch C are communicated over the SIP network, and the switch C and the switch D are communicated via ISUP protocol. When a calling terminal that belongs to the switch A initiates a call to a called terminal that belongs to the switch D, if the number portability service is available, the switch A executes the number portability query and obtains the location routing number (LRN) returned from the number portability query database. Then the switch A generates an IAM message carrying the number portability information and sends it to the switch B. Since the switch B and the switch C are communicated with each other via the SIP protocol, the switch B performs the method for converting ISUP message into SIP message of the embodiment shown in FIG. 1 to obtain the SIP message, which is then transmitted to the switch C over the SIP network. Since the ISUP protocol is used between the switch C and the switch D, the method for converting. SIP message into ISUP message of the embodiment shown in FIG. 3 is performed at the switch C to obtain the ISUP message, which is then transmitted to the switch D. In addition, the switch B and the switch C are provided with the conversion apparatus for converting ISUP message into SIP message and the conversion apparatus for converting SIP message into ISUP message respectively.

Although the method for converting ISUP message into SIP message for number portability service and the related conversion apparatus, as well as the method for converting SIP message into ISUP message for number portability service and the related conversion apparatus of the present invention have been described above through some exemplary embodiments, these embodiments are not exhaustive, those skilled in the art can realize various changes and modifications within the spirit and scope of the invention. Therefore, the present invention is not limited to these embodiments, and the scope of the invention is only defined by the appended claims.

The invention claimed is:

1. A method for converting ISDN User Part (ISUP) message into Session Initiation Protocol (SIP) message for number portability service, comprising:
   receiving the ISUP message;
   reading parameters related to number portability from the ISUP message;
   determining a number portability type according to the parameters related to number portability;
   mapping the parameters related to number portability into the SIP message based on the number portability type, wherein the SIP message includes: destination address parameter, which represents destination user number; number portability dip (npdi) parameter, which indicates execution of the number portability dip and uniquely identifies the number portability type; and routing number (rn) parameter, which represents the number to be routed to the destination user number.

2. The method according to claim 1, wherein the step of determining a number portability type comprises:
   querying a number portability type database to retrieve the number portability type, wherein the number portability type database records the number portability types and the parameters related to number portability in the corresponding ISUP messages.

3. The method according to claim 2, wherein in the number portability type database,
   when the number portability type is Type 1, the parameters related to number portability in the corresponding ISUP message comprises: number translation indicator bit in forward call indicator (FCI), called party number (CdPN) and generic address parameter (GAP);
   when the number portability type is Type 2, the parameters related to number portability in the corresponding ISUP message comprises: called party number (CdPN), called directory number (CdDN) and nature of address (NOA) parameter;
   when the number portability type is Type 3, the parameters related to number portability in the corresponding ISUP message comprises: called party number (CdPN) and network routing number (NRN);
   when the number portability type is Type 4, the parameters related to number portability in the corresponding ISUP message comprises: called party number (CdPN) and nature of address (NOA) parameter, wherein the called party number is formed by concatenating routing number and directory number.

4. The method according to claim 3, wherein the step of mapping the parameters related to number portability into the SIP message comprises:
   when the number portability type is Type 1,
      mapping the generic address parameter to the destination address parameter;
      mapping the called party number to the routing number parameter; and
      setting the npdi parameter to value 1;
   when the number portability type is Type 2,
      mapping the called directory number to the destination address parameter;
      mapping the called party number to the routing number parameter; and
      setting the npdi parameter to value 2;
   when the number portability type is Type 3,
      mapping the called party number to the destination address parameter;
      mapping the network routing number to the routing number parameter; and
      setting the npdi parameter to value 3;
   when the number portability type is Type 4,
      mapping the called party number to the destination address parameter; and
      setting the npdi parameter to value 4; or mapping the directory number in the called party number to the destination address parameter;
      mapping the routing number in the called party number to the routing number parameter; and setting the npdi parameter to value 4.

5. A conversion apparatus for converting ISDN User Part (ISUP) message into Session Initiation Protocol (SIP) message for number portability service, comprising:
   receiving means that receives the ISUP message;
   reading means that reads parameters related to number portability from the ISUP message;
   type determination means that determines a number portability type according to the parameters related to number portability;
   mapping means that maps the parameters related to number portability into the SIP message based on the number portability type, wherein the SIP message includes: destination address parameter, which represents destination user number; number portability dip (npdi) parameter, which indicates execution of the number portability dip and uniquely identifies the number portability type; and routing number (rn) parameter, which represents the number to be routed to the destination user number.

6. The apparatus according to claim 5, wherein the type determination means comprises:
   querying unit that queries a number portability type database to retrieve the number portability type, wherein the number portability type database records the number portability types and the parameters related to number portability in the corresponding ISUP messages.

7. The apparatus according to claim 6, wherein in the number portability type database,
   when the number portability type is Type 1, the parameters related to number portability in the corresponding ISUP message comprises: number translation indicator bit in forward call indicator (FCI), called party number (CdPN) and generic address parameter (GAP);
   when the number portability type is Type 2, the parameters related to number portability in the corresponding ISUP message comprises: called party number (CdPN), called directory number (CdDN) and nature of address (NOA) parameter;
   when the number portability type is Type 3, the parameters related to number portability in the corresponding ISUP message comprises: called party number (CdPN) and network routing number (NRN);
   when the number portability type is Type 4, the parameters related to number portability in the corresponding ISUP message comprises: called party number (CdPN) and nature of address (NOA) parameter, wherein the called party number is formed by concatenating routing number and directory number.

8. The apparatus according to claim 7, wherein the mapping means comprises:
mapping unit that maps the generic address parameter to the destination address parameter and maps the called party number to the routing number parameter when the number portability type is Type 1, maps the called directory number to the destination address parameter and maps the called party number to the routing number parameter when the number portability type is Type 2, maps the called party number to the destination address parameter and maps the network routing number to the routing number parameter when the number portability type is Type 3, maps the called party number to the destination address parameter, or maps the directory number in the called party number to the destination address parameter and maps the routing number in the called party number to the routing number parameter when the number portability type is Type 4; and
a setting unit that sets the npdi parameter to value 1 when the number portability type is Type 1, sets the npdi parameter to value 2 when the number portability type is Type 2, sets the npdi parameter to value 3 when the number portability type is Type 3, and sets the npdi parameter to value 4 when the number portability type is Type 4.

9. A method for converting Session Initiation Protocol (SIP) message into ISDN User Part (ISUP) message for number portability service, wherein the SIP message includes: destination address parameter, which represents destination user number; number portability dip (npdi) parameter, which indicates execution of the number portability dip and uniquely identifies a number portability type; and routing number (rn) parameter, which represents the number to be routed to the destination user number; the method comprising:
receiving SIP message;
reading the npdi parameter from the SIP message to determine the number portability type;
determining parameters related to number portability in the ISUP message based on the number portability type; and
mapping the destination address parameter and the routing number parameter in the SIP message to the parameters related to number portability in the ISUP message respectively.

10. The method according to claim 9, wherein the step of determining parameters related to number portability in the ISUP message comprises:
querying a number portability type database to retrieve the parameters related to number portability, wherein the number portability type database records the number portability types and the parameters related to number portability in the corresponding ISUP messages.

11. The method according to claim 10, wherein in the number portability type database,
when the number portability type is Type 1, the parameters related to number portability in the corresponding ISUP message comprises: number translation indicator bit in forward call indicator (FCI), called party number (CdPN) and generic address parameter (GAP);
when the number portability type is Type 2, the parameters related to number portability in the corresponding ISUP message comprises: called party number (CdPN), called directory number (CdDN) and nature of address (NOA) parameter;
when the number portability type is Type 3, the parameters related to number portability in the corresponding ISUP message comprises: called party number (CdPN) and network routing number (NRN);
when the number portability type is Type 4, the parameters related to number portability in the corresponding ISUP message comprises: called party number (CdPN) and nature of address (NOA) parameter, wherein the called party number is formed by concatenating routing number and directory number.

12. The method according to claim 11, wherein the step of mapping the destination address parameter and the routing number parameter in the SIP message to the parameters related to number portability in the ISUP message respectively comprises:
for Type 1,
setting the number translation indicator bit to 1;
mapping the routing number parameter to the called party number; and
mapping the destination address parameter to the generic address parameter;
for Type 2,
mapping the routing number parameter to the called party number;
mapping the destination address parameter to the called directory number; and
setting the nature of address parameter to a special value for number portability;
for Type 3,
mapping the destination address parameter to the called party number; and
mapping the routing number parameter to the network routing number;
for Type 4,
mapping the destination address parameter to the called party number; and
setting the nature of address parameter to 126; or
concatenating the routing number parameter and the destination address parameter, and mapping to the called party number; and
setting the nature of address parameter to 126.

13. A conversion apparatus for converting Session Initiation Protocol (SIP) message into ISDN User Part (ISUP) message for number portability Service, wherein the SIP message includes: destination address parameter, which represents destination user number; number portability dip (npdi) parameter, which indicates execution of the number portability dip and uniquely identifies a number portability type; and routing number (rn) parameter, which represents the number to be routed to the destination user number; the apparatus comprising:
receiving means that receives the SIP message;
reading means that reads the npdi parameter from the SIP message to determine the number portability type;
parameter determination means that determines parameters related to number portability in the ISUP message based on the number portability type; and
mapping means that maps the destination address parameter and the routing number parameter in the SIP message to the parameters related to number portability in the ISUP message respectively.

14. The apparatus according to claim 13, wherein the parameter determination means comprises:

querying unit that queries a number portability type database to retrieve the parameters related to number portability in the ISUP message, wherein the number portability type database records the number portability types and the parameters related to number portability in the corresponding ISUP messages.

15. The apparatus according to claim 14, wherein in the number portability type database,
- when the number portability type is Type 1, the parameters related to number portability in the corresponding ISUP message comprises: number translation indicator bit in forward call indicator (FCI), called party number (CdPN) and generic address parameter (GAP);
- when the number portability type is Type 2, the parameters related to number portability in the corresponding ISUP message comprises: called party number (CdPN), called directory number (CdDN) and nature of address (NOA) parameter;
- when the number portability type is Type 3, the parameters related to number portability in the corresponding ISUP message comprises: called party number (CdPN) and network routing number (NRN);
- when the number portability type is Type 4, the parameters related to number portability in the corresponding ISUP message comprises: called party number (CdPN) and nature of address (NOA) parameter, wherein the called party number is formed by concatenating routing number and directory number.

16. The apparatus according to claim 15, wherein the mapping means comprises:
- mapping unit that maps the routing number parameter to the called party umber and maps the destination address parameter to the generic address parameter for Type 1, maps the routing number parameter to the called party number and maps the destination address parameter to the called directory number for Type 2, maps the destination address parameter to the called party number and maps the routing number parameter to the network routing number for Type 3, maps the destination address parameter to the called party number, or concatenates the routing number parameter and the destination address parameter and maps to the called party number for Type 4; and
- setting unit that sets the number translation indicator bit to 1 for Type 1, sets the nature of address parameter to a special value for number portability for Type 2, and sets the nature of address parameter to 126 for Type 4.

* * * * *